United States Patent Office 3,329,674
Patented July 4, 1967

3,329,674
AZIRIDINYL DERIVATIVES OF POLY-FUNCTIONAL EPOXIDES
George F. Bulbenko and Riad H. Gobran, Levittown, and Elizabeth A. Blommers, Abington, Pa., assignors to Thiokol Chemical Corporation, Bristol, Pa., a corporation of Delaware
No Drawing. Filed Nov. 1, 1963, Ser. No. 320,856
1 Claim. (Cl. 260—239)

The present invention relates to aziridinyl derivatives of polyfunctional epoxides. More specifically, it relates to a novel class of compounds which are the reaction products of alkylenimine and polyfunctional epoxides which reaction products are useful as curing agents for carboxyl group containing or terminated polymers.

In order to be effectively and practically useful, a curing or cross-linking agent must possess certain attributes. In addition to the requirement that the curing agent be polyfunctional, it is advantageous that the curing agent react or crosslink with the polymer to be cured at a relatively low temperature i.e., room or ambient temperatures, which, for purposes of the present invention is defined as a temperature from about 20–30° C. Moreover, it is also desirable that the curing proceed, without the assistance of a catalyst, as rapidly as mixing and other physical parameters of the process permit. It is also desirable, but not absolutely necessary, that the curing agent be a low molecular weight compound, and, for handling and mixing reasons, be moderately viscous.

An object of the present invention, therefore, is to provide a class of compounds which may be readily used at room temperature to cure or crosslink liquid, carboxyl group containing polymers.

A further object of the present invention is to provide a process for the preparation of this novel class of compounds.

It has been unexpectedly found that an effective room temperature curing agent for carboxyl group containing polymers can be prepared by reacting an alkylenimine containing not more than 6 carbon atoms and a polyfunctional epoxide in a mole ratio proportional to the functionality of the epoxide. The alkylenimines which may be used include ethylenimine, propylenimine, 1,2-butylenimine and isobutylenimine.

According to the present invention, the polyfunctional epoxide reactant containing two or more ethoxyline groups reacts with the alkylenimine to form an adduct which reaction can be described by the equation:

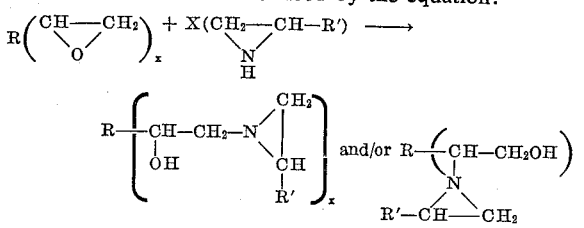

where x is the functionality of the polyepoxide, R is the connecting structure of the ethoxyline groups of the polyfunctional epoxide and R' is H or a lower alkyl group.

Exemplary of the numerous polyfunctional materials which may be epoxidized and thus employed in the present invention are the polyphenolic compounds, such as bisphenol A or bis(4-hydroxyphenyl) dimethylmethane and the novolac resins, polyunsaturated compounds such as butadiene and poly-alcohols such as glycerine.

As used herein, "adduct" is defined as the reaction product of the alkylenimine and the polyepoxy compound. The resultant adducts are yellow to brownish, moderately to highly viscous to solid materials which, when liquid, increase somewhat in viscosity upon standing but remain workable after several months in storage under ambient conditions. The reaction of the polyepoxy compound and the imines is carried out in solution and under moderate temperatures of about 25–65° C. to prevent the adduct product from crosslinking with itself. After the reaction is completed, which may take from 2 to 3 days, the solvent and unreacted imine, if any, are removed from the reaction mixture under moderature temperatures of about 25–65° C. and preferably below 45° C. using vacuum. This moderate temperature is again utilized to prevent crosslinking of the adduct. It is preferable to add the polyfunctional epoxide, thinned with a solvent, to a 100 mol percent excess of the moderately heated imine and mechanically agitate the mixture for the required reaction time.

Exemplary of the adducts of the present invention is that produced by the reaction of propylenimine and N,N-di(2,3-epoxypropyl)-4-(2,3-epoxy - 1 - propoxy) aniline which takes place according to the following reaction:

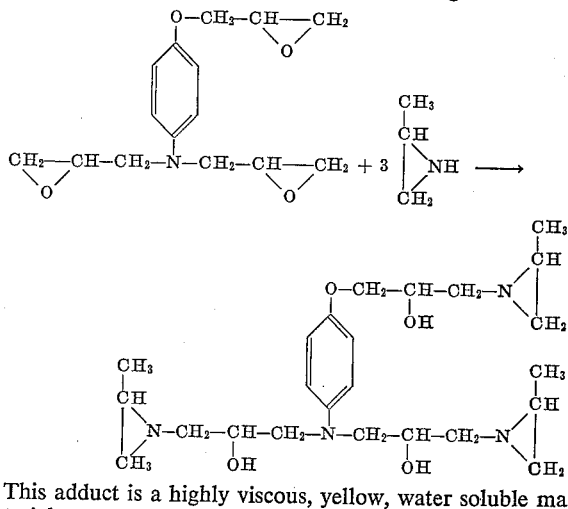

This adduct is a highly viscous, yellow, water soluble material.

As mentioned above, in order to function as a crosslinking agent, the curing agent must exhibit a functionality of two or more. The functionality of such a curing agent is defined as the number of groups it contains which can be used to crosslink, or join, two or more complementary reactive groups on the polymer to be crosslinked, or cured. It is believed that the reaction involved in curing the carboxyl-terminated polymers with the above adducts is the following:

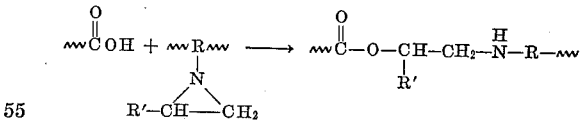

In addition to permitting the relatively fast room temperature cure of carboxyl containing polymers, the use of the adduct curing agent of the present invention can produce a cured polymer which exhibits excellent heat aging stability properties. This physical property i.e., stability under heat aging conditions, of a cured polymer can be demonstrated by a relatively high stress relaxation time which may be defined as follows: An elastomer is stretched to a given elongation at a given temperature. The force necessary to maintain this constant elongation is followed with time. The stress relaxation time can then be defined as the time necessary for the force to reach 38.6% of its original force. It is usually presented in hours. When the adducts of the present invention are used to cure butadiene polymers and the temperature the stretched polymer is subjected to is relatively high, i.e., about 250° F., a stress relaxation of over 20 hours is considered good. Cured butadiene polymers using the curing agents of the present invention exhibit stress relaxation values of about 25 hours to 30 hours.

As mentioned above, the polyfunctional curing agents of the present invention may be used to readily effect room temperature cures of carboxyl containing or terminated polymers. This is most advantageous when the mass of polymer being cured is of such a size, weight or shape that heating is difficult or apt to be nonuniform or if the resin being cured is admixed with or applied to a material which cannot tolerate elevated temperatures. Although it is known in the art that epoxides may be used as curing agents for carboxyl containing or terminated polymers, the conventional prior art epoxides suffer from the disadvantage that the use of these compounds generally requires the addition of a catalyst, whereas the novel adducts of the present invention may be used without such catalysts. These adducts may be used individually as curing agents or they may be dissolved in or admixed with other alkylenimines, epoxides, adducts of alkylenimines and epoxides and other curing agents, to achieve the desired curing rate and physical properties of the curing agent itself and subsequently cured polymer. The adduct may also be thinned with various solvents to obtain the desired viscosity.

The curing agents of the present invention may be used to cure such carboxyl containing or terminated interpolymers such as butadiene/acrylic acid copolymers, ethylene/acrylic acid copolymers, butadiene/acrylonitrile/acrylic acid interpolymers and carboxyl-containing polybutadiene polymers, and when used as such the adducts should be present in about 4 to 8% by weight of the polymer being cured. Carboxyl containing or terminated polymers cured with the novel adducts of the present invention have their ultimate use as binders for rocket propellants, adhesives, sealants, etc., and the use of such adducts as curing agents offers a versatile system wherein the operating parameters may be readily altered to meet the needs of the curing operation.

The following examples are merely illustrative of the present invention and are not intended as a limitation upon the scope thereof.

EXAMPLE 1

A 500 ml. three necked round-bottomed flask, equipped with stirrer, thermometer, reflux condenser and dropping funnel was charged with 98.0 grams of propylenimine (1.72 mol). All outlets were stoppered with tubes containing sodium hydroxide and heat was then applied to the system. After the temperature of the system reached 36–36° C., 83.3 grams of distilled N,N-di(2,3-epoxypropyl)-4-(2,3-epoxy-1-propoxy) aniline (0.86 epoxy equivalents) diluted with 17.2 grams of benzene, was slowly added during an interval of 67 minutes by means of the dropping funnel. During this addition the temperature of the system was maintained at about 35° C. The mixture was then heated to 45–50° C. for one hour and forty minutes and then to 60–65° C. for an additional three hours. The system was cooled to room temperature and allowed to stand at this temperature overnight. The next morning the reaction system was heated to about 30° C. and the reaction continued for 24 hours after which the temperature was raised to 60–65° C. and continued for an additional 24 hours. After standing at room temperature over the weekend, the system was opened and the reaction product stripped of benzene and unreacted propylenimine by heating at 37° C. at a pressure of 16 mm. for two hours and at 46° C. and 0.3 mm. for 1 hour and twenty-five minutes. The weight of the highly viscous yellow reaction product was 131.4 grams which corresponded to a 99.2% yield.

The reaction product, which will be termed the adduct, was calculated to have a 12.5% nitrogen content and upon analysis was found to contain 12.4% nitrogen. When used as a curing agent for a butadiene/acrylic acid copolymer, the adduct was added at a ratio of 0.74 imine groups to 1 carboxyl group. The cure cycle was 72 hours at 170° F. and resulted in a cured product having a Shore A Hardness of 30 and a stress relaxation value of 26 hours at 248° F.

EXAMPLE 2

In this example, 1,2-butylenimine was substituted for the propylenimine used in Example 1. The reaction was carried out as outlined in Example 1 and resulted in 55.2 grams or 98.7% yield of a tacky yellowish adduct. This adduct was used as a curing agent for a room temperature cure of a butadiene/acrylic acid copolymer. The cure cycle was 2 weeks and the resultant cured polymer had a Shore A Hardness of 27 and a stress relaxation value of 25 hours at 248° F. The ratio of imine group to carboxyl was the same as Example 1.

EXAMPLE 3

In this example, the apparatus, operating parameters and reactant quantities were the same as outlined in Example 1. A technical grade of N,N-di(2,3-epoxypropyl)-4-(2,3-epoxy-1-propoxy)aniline was again slowly added to, as the imine reactant, isobutylenimine, to yield 15.6 grams or 92.9% of a highly viscous brownish adduct, useful as a curing agent for carboxyl terminated or containing polymers.

EXAMPLE 4

This reaction was conducted in the same manner as Example 1 except that 4,4'-diepoxide of bisphenol A was substituted for the N,N-di(2,3-epoxypropyl)-4-(2,3-epoxy-1-propoxy)aniline. The resulting product was a highly viscous brownish product (99.4% yield) which was subsequently used as a curing agent for a polybutadiene/acrylic acid copolymer using an imine to carboxyl ratio of 1 to 1. The cure cycle was 72 hours at 170° F. and the resultant cured polymer had a Shore A Hardness of 41 and a stress relaxation value of 15 hours at 248° F. When the cure cycle was changed to 2 weeks at room temperature the cured polymer had a Shore A Hardness of 45 and a stress relaxation value of 17 hours at 248° F.

EXAMPLE 5

This example was conducted using the same reaction parameters as in the previous examples. The reactants employed were epoxidized glycerine having the formula

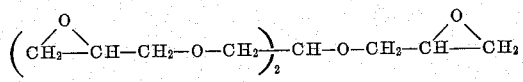

and propylenimine and the reaction resulted in a hazy, moderately viscous product which reaction product was used to cure a carboxyl terminated polybutadiene polymer. Cure conditions comprised an imine group to carboxyl group ratio of about 1:1 and the cure cycle was 72 hours at 170° F. The resultant cured polymer had a Shore A Hardness of 35 and a stress relaxation value of 26 hours at 248° F. When the cure cycle was changed to two weeks at room temperature the Shore A Hardness was 25 and the stress relaxation value was 22 hours at 248° F.

EXAMPLE 6

The reaction parameters were the same in this example as in the previous examples except that the benzene was omitted. The reactants employed to produce this adduct were propylenimine and butadiene dioxide and the product was a moderately viscous liquid which was obtained in a yield of 58.1 grams or 97% of theory. The adduct was subsequently used to cure a carboxyl terminated polybutadiene polymer in a mole ratio of imine to carboxyl of 0.63 to 1. Cure conditions were 72 hours at 170° F. which resulted in a cured polymer having a Shore A Hardness of 29 and stress relaxation value of 28 hours at 248° F. When cure conditions were changed to 14 days at room temperature the Shore A Hardness decreased to 4 and the stress relaxation value was 19 hours at 248° F.

EXAMPLE 7

The reaction parameters were the same as in the previous examples except that the reaction mixture was held at the 60–65° C. temperature for two additional days. The reactants were propylenimine and 2,6-(2,3-epoxypropyl)phenyl glycidyl ether and the adduct was a highly viscous slightly tacky material useful as a curing agent for carboxyl containing polymers.

We claim:
A compound having the structure

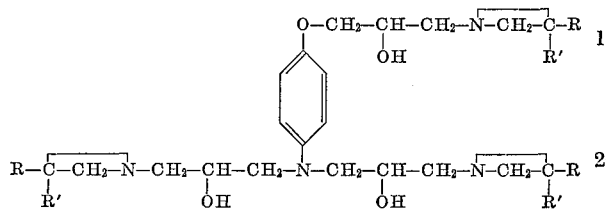

in which R and R' are selected from the group consisting of H and lower alkyl groups.

References Cited

UNITED STATES PATENTS 3,235,421   2/1966   Berenbaum et al. ____ 260—80.7

FOREIGN PATENTS 885,942   9/1943   France.

OTHER REFERENCES

Gould et al., "The Crystal Structure of meso-1,4-diaziridinyl-2,3-butanediol," Journal of the Amer. Chem. Soc., 83, 2658–61 (1961).

Reist et al., Journal of Organic Chemistry, 26, 2139–42 (1961).

JOSEPH L. SCHOFER, *Primary Examiner.*

H. I. CANTOR, *Assistant Examiner.*

UNITED STATES PATENT OFFICE
CERTIFICATE OF CORRECTION

Patent No. 3,329,674                         July 4, 1967

George F. Bulbenko et al.

It is hereby certified that error appears in the above numbered patent requiring correction and that the said Letters Patent should read as corrected below.

Column 3, line 51, for "36-36° C." read -- 35-36° C. --.

Signed and sealed this 20th day of August 1968.

(SEAL)
Attest:

Edward M. Fletcher, Jr.                      EDWARD J. BRENNER

Attesting Officer                            Commissioner of Patents